United States Patent
Kochsiek

(10) Patent No.: US 6,718,636 B1
(45) Date of Patent: *Apr. 13, 2004

(54) METHOD FOR FINISHING THE BALL CUP OF A HOMOCINITIC JOINT

(75) Inventor: Guido Kochsiek, Leopoldshohe (DE)

(73) Assignee: Iprotec Maschinon-und Edolstohlprodukye GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/555,977

(22) PCT Filed: Dec. 2, 1998

(86) PCT No.: PCT/EP98/07843

§ 371 (c)(1),
(2), (4) Date: Aug. 7, 2000

(87) PCT Pub. No.: WO99/30054

PCT Pub. Date: Jun. 17, 1999

(30) Foreign Application Priority Data

Dec. 6, 1997 (EP) .............................. 97121487

(51) Int. Cl.⁷ .............................. B21K 1/04; B21D 53/10
(52) U.S. Cl. .............................. 29/898.066; 29/898.06; 29/557; 29/558; 82/1.11
(58) Field of Search ..................... 29/898.063, 898.066; 451/52; 407/30, 34, 53; 409/131, 132; 82/120, 121, 129, 1.11

(56) References Cited

U.S. PATENT DOCUMENTS

| 1,975,758 A | * | 10/1934 | Stuber |
| 3,030,739 A | * | 5/1962 | Folley |
| 3,618,191 A | * | 11/1971 | Willimek et al. |
| 4,116,020 A | | 9/1978 | Aucktor et al. |
| 4,437,331 A | * | 3/1984 | Dore |
| 4,575,362 A | | 3/1986 | Girguis |
| 4,593,444 A | * | 6/1986 | Kavthekar |
| 4,611,373 A | * | 9/1986 | Hazebrook |
| 4,820,240 A | * | 4/1989 | Girguis |
| 1,916,442 A | * | 7/1993 | Rzeppa |
| 5,681,209 A | * | 10/1997 | Naumann et al. |
| 6,557,257 B2 | * | 5/2003 | Johnson et al. |

FOREIGN PATENT DOCUMENTS

| DE | 40 34 516 A1 | | 5/1991 |
| DE | 42 12 238 A1 | | 10/1993 |
| WO | 92/14580 | * | 3/1992 |
| WO | 96/38680 | | 12/1996 |

OTHER PUBLICATIONS

Form–Dreh–Zentrum FDZ 100, pp. 14–19.
Eidesstattliche Versicherung.

* cited by examiner

*Primary Examiner*—Gregory Vidovich
*Assistant Examiner*—Eric Compton
(74) *Attorney, Agent, or Firm*—Cantor Colburn LLP

(57) ABSTRACT

The invention relates to a method for finishing the ball cup of a homocinitic joint, especially for motor vehicles, having a ball ring-shaped bearing surface for the ball cage and a plurality of essentially axial running guideways which interrupt said ball ring-shaped bearing surface. The guideways are provided for the balls which are arranged in the ball recesses of the ball cage and which transmit torque between the ball cup and the ball star. In order to be able to finish such ball shells quickly, economically and as fully automatic as possible, the invention provides that both the ball ring-shaped bearing surface for the ball cage as well as the guideways for the balls are produced by means of a turning machining.

10 Claims, 2 Drawing Sheets

METHOD FOR FINISHING THE BALL CUP OF A HOMOCINITIC JOINT

TECHNICAL FIELD

The invention concerns a process for finish-machining the bearing casing of a constant-velocity joint, especially for automobiles, with a spherical bearing surface for the bearing cage and a plurality of guide tracks that basically run axially and interrupt the spherical bearing surface for the bearings transmitting the torques between the bearing casing and the bearing star arranged in the pocket of the bearing cage.

BACKGROUND OF THE INVENTION

In automobiles with front-wheel drive, the front wheels are driven by joints. Therefore, front-wheel axle shafts must have joints that allow the wheels both to spring in and out, and also to lock. Constant-velocity joints (homokinetic joints) are used to make the wheels drive as steadily as possible. Fixed constant-velocity joints designed as cap joints are used for joints on the front axle shafts, inter alia, while for joints on the rear axle shafts moving constant-velocity joints designed as cap joints are used that allow axial movement in addition to flexure of the joint.

These cap joints are comprised of a bearing star set on the wheel end of the axle shaft, on which the bearing cage with its bearings and the bearing casing connected to the wheel driveshaft sit. On a fixed constant-velocity joint, the bearing casing and star have curved tracks on which the bearings move. On a moving constant-velocity joint, the tracks on the bearing casing and star are designed to be even.

On the constant-velocity joints comprised of a bearing star, bearing cage and bearing casing that are known in practice, the finish-machining of the bearing casing, which has a bearing surface for the cage and guide tracks for the balls, takes a large number of different steps, which are sometimes done on different machines. Starting from a drop-forged bearing-casing blank, in the known finish-machining methods, the guide tracks are produced by broaching and/or milling and final grinding, while the bearing surface is produced by turning. Machining is very expensive, especially finish-machining bearing casings of fixed constant-velocity joints, because both the bearing surface and the guide tracks are designed to be curved in the axial direction of the bearing casing.

The disadvantage of this known production method is that because different machine-tooling methods are used, in which the bearing casing being machined must be transformed many times and potentially fed to different machines, it is very time-consuming and hence expensive to finish-machine the bearing casing. What is more, because of the various transformations, defects occur so that tolerances are only possible within certain limits.

SUMMARY OF THE INVENTION

The problem of the invention is to provide a method of finish-machining the bearing casing of a constant-velocity joint so that bearing casings can be finish-machined in a simple, inexpensive way that can be fully automatated with high precision.

The invention solves this problem by producing both the spherical bearing surface for the bearing cage and the guide tracks for the bearings by a turning operation.

This production method in the invention makes it possible, for the first time, to make the bearing casing of a constant-velocity joint by a uniform machine-tooling method, namely a turning operation method, where the turning occurs after the chucking of the blank of a bearing case. As a result of machining only by the turning operation on a machine, the method in the invention has a clear advantage in terms of time, cost and precision over the finish-machining method known in practice.

One practical embodiment of the invention proposes that the axial course of the guide tracks be designed purely spherically.

The invention also proposes that the axial course of the guide tracks be composed of a cylindrical part and a spherical part. Both sorts of bearing casings are used for fixed constant-velocity joints.

The invention also proposes that the guide tracks can run either parallel to the axis or at a sharp angle to the axis of rotation of the bearing casing.

In one practical embodiment of the invention, the tangents of the balls with the accompanying guide tracks run spatially parallel to one another. In particular, the design of the spherical guide tracks also proposes that the distance between the tangents of the balls and the accompanying guide tracks change in the axial direction, which optimizes the transmission of torque.

One special embodiment of the invention proposes that the bearing casing have a polygonal opening on the bottom to connect it to the wheel driveshaft. The design of this polygonal opening for the wheel driveshaft makes it possible to design the bearing casing as a standard component for different constant-velocity joints, since the respective drive can be adjusted via the wheel driveshaft made as a separate component. It is also easier to manufacture a bearing casing without a wheel driveshaft molded onto it. In one advantageous embodiment of this bearing casing, the polygonal opening is designed to be conical in the axial direction. This conicity of the polygonal opening permits self-centering of components being connected to one another.

Lastly, the invention proposes that bearing casing and wheel driveshaft be designed as a one-piece component and the rotary method be a hard rotary method, so that even hardened workpieces can be machined.

BRIEF DESCRIPTION OF THE DRAWING

Other features and advantages of the invention will emerge from the following description of the accompanying drawings.

DETAILED DESCRIPTION OF THE INVENTION

Figure 1:
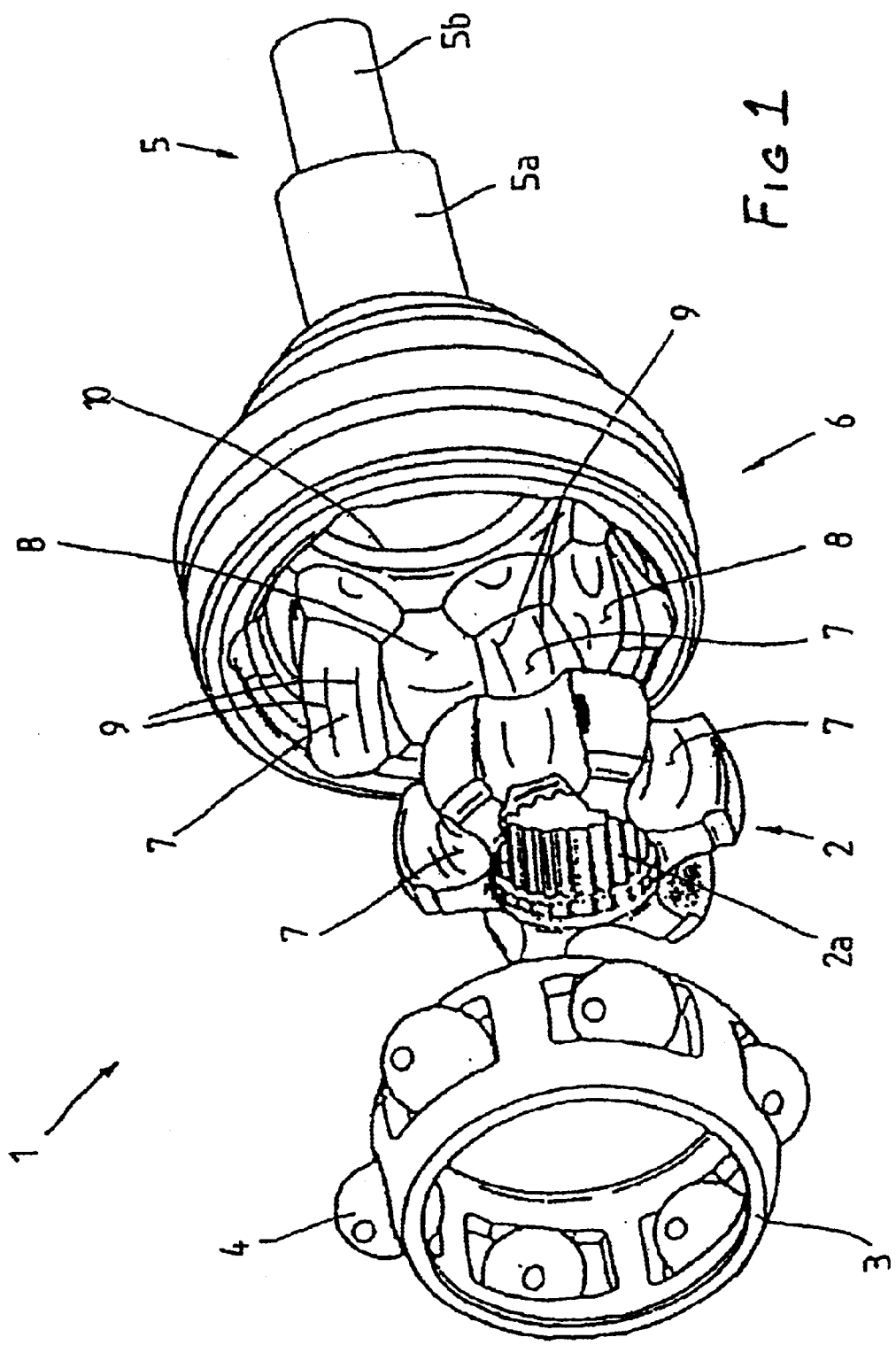
FIG. 1 illustrates a schematic design of a fixed constant-velocity joint with a bearing casing machined according to the invention.

The fixed constant-velocity joint 1 shown is comprised of a bearing star 2 set on the wheel end of the axle shaft via teeth 2a, on which a bearing cage 3 with bearings 4 and a bearing casing 6 connected to a wheel driveshaft 5 sit.

On the constant-velocity joint, designed as a fixed constant-velocity joint 1, the bearing casing 6 and the bearing star 2 have spherically curved guide tracks 7, on which the bearings 4 move. The bearing casing 6 has a spherical bearing surface 8 for mounting the bearing cage 3.

In the example of the embodiment shown, the tangents 9 of the bearing casing 6 run spatially parallel to one another on the accompanying guide track 7.

In the example of embodiment of a fixed constant-velocity joint 1 shown, the bearing casing 6 and the wheel driveshaft 5 are designed as separate components. To connect the bearing casing 6 to the wheel driveshaft 5, there is a polygonal opening 10 in the base of the bearing casing 6, into which the wheel driveshaft 5 can be inserted, with a polygonal projection molded on accordingly. To make these adjacent polygonal surfaces self-centering, the polygonal opening 10 and the polygonal projection on the wheel driveshaft 5 are designed to be conical in the axial direction.

The part of the wheel driveshaft 5 pointing away from the bearing casing 6 is comprised of a cylindrical part 5*a* for the wheel bearing and a connecting part 5*b* to connect it to the wheel being driven. This connecting part 5*b* can have, for example, a polygonal outer contour or teeth on the outside.

Unlike the example of embodiment shown, it is obviously also possible to design the bearing casing 6 and the wheel driveshaft 5 as a one-piece component.

Figure 2:
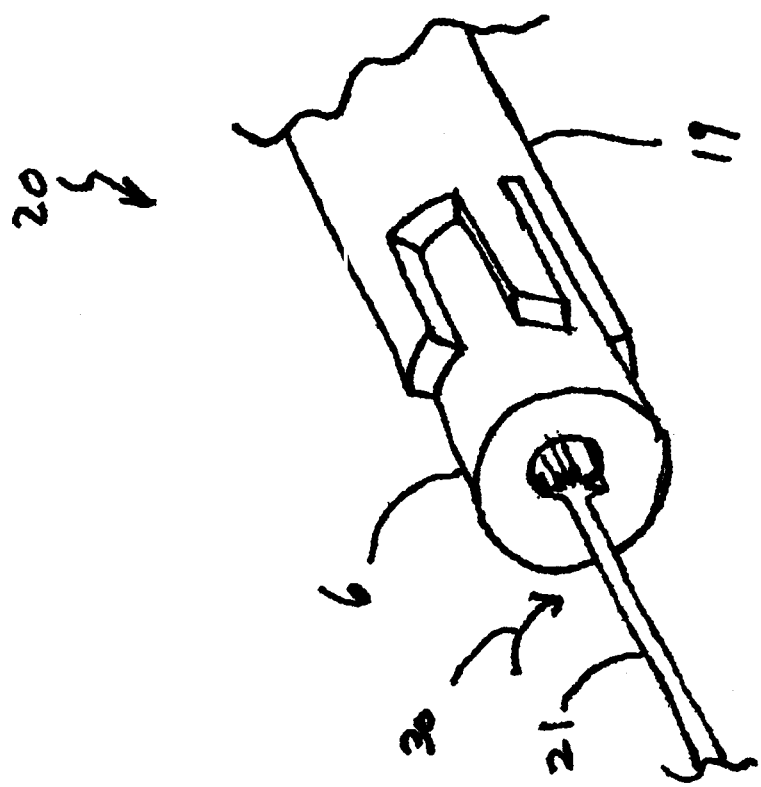
FIG. 2 illustrates a method of finishing a bearing casing.

Referring to FIGS. 1–2, a method of finishing a bearing casing is illustrated. The method includes clamping the blank of a bearing casing 6 in the chuck 19 of a machine (e.g., a lathe 20) and producing the spherical bearing surface 8 for the bearing cage 3 as well as the guide tracks 7 for the bearings 4 with a cutting tool 21 by a turning operation 30. As a result of machining only by the turning operation on a machine, the method in the invention has a clear advantage in terms of time, cost and precision over the finish-machining method known in practice.

What is claimed is:

1. A method of finish-machining a bearing casing of a constant-velocity joint with a spherical bearing surface for a bearing cage and a plurality of guide tracks that basically run axially and interrupt the spherical bearing surface, for balls arranged in bearing pockets of the bearing cage transmitting torque between the bearing casing and a bearing star, wherein both the spherical bearing surface for the bearing cage and the guide tracks for bearing are produced only by a hard rotary turning operation, the turning operation is carried out in a single chucking position.

2. The method according to claim 1, wherein the axial course of the guide tracks is designed to be purely spherical.

3. The method according to claim 1, wherein the axial course of the guide tracks is composed of a spherical part and a cylindrical part.

4. The method according to claim 1, wherein the guide tracks run parallel axially.

5. The method according to claim 1, wherein the guide tracks run at a sharp angle to the axis of rotation of the bearing casing.

6. The method according to claim 1, wherein the tangents of the bearings run parallel to one another spatially with the accompanying guide tracks.

7. The method according to claim 1, wherein the distance between the tangents of the bearings and the accompanying guide tracks changes in the axial direction.

8. The method according to claim 1, wherein the bearing casing has a polygonal opening in its base to connect it to a wheel driveshaft.

9. The method according to claim 8, wherein the polygonal opening is designed to be conical in the axial direction.

10. The method according to claim 1, wherein the bearing casing and the wheel driveshaft are designed as a one-piece component.

\* \* \* \* \*